US010041180B2

(12) United States Patent
Davis et al.

(10) Patent No.: US 10,041,180 B2
(45) Date of Patent: *Aug. 7, 2018

(54) METHOD FOR CONCENTRATING AN AQUEOUS CAUSTIC ALKALI VIA SPLITTING A CATHOLYTE INTO A FIRST STREAM FOR HEAT RECOVERY AND A SECOND STREAM FOR EVAPORATION

(71) Applicant: Westlake Vinyl Corporation, Houston, TX (US)

(72) Inventors: Anthony B. Davis, Calvert City, KY (US); Thomas H. Yohe, Oak Forest, IL (US); Russell F. Dunn, Cantonment, FL (US)

(73) Assignee: WESTLAKE VINYL CORPORATION, Houston, TX (US)

( * ) Notice: Subject to any disclaimer, the term of this patent is extended or adjusted under 35 U.S.C. 154(b) by 560 days.

This patent is subject to a terminal disclaimer.

(21) Appl. No.: 14/666,098

(22) Filed: Mar. 23, 2015

(65) Prior Publication Data

US 2015/0191838 A1 Jul. 9, 2015

Related U.S. Application Data

(60) Division of application No. 13/650,932, filed on Oct. 12, 2012, now Pat. No. 8,986,517, which is a
(Continued)

(51) Int. Cl.
*C01D 1/42* (2006.01)
*B01D 1/26* (2006.01)
(Continued)

(52) U.S. Cl.
CPC ............... *C25B 15/08* (2013.01); *B01D 1/26* (2013.01); *C01D 1/40* (2013.01); *C01D 1/42* (2013.01);
(Continued)

(58) Field of Classification Search
None
See application file for complete search history.

(56) References Cited

U.S. PATENT DOCUMENTS 4,090,932 A 5/1978 Kazihara et al.
4,145,265 A 3/1979 Nakata et al.
(Continued)

FOREIGN PATENT DOCUMENTS

FR 2337688 8/1977

OTHER PUBLICATIONS

Rao, M.A. and Vitali, A.A. "Concentration of Fruit Juices." Handbook of Food Preservation. 1999. Marcel Dekker, Inc. pp. 234-238.

*Primary Examiner* — Christopher Adam Hixson
*Assistant Examiner* — Michelle Adams
(74) *Attorney, Agent, or Firm* — Schultz & Associates, P.C.

(57) ABSTRACT

A method for concentrating an aqueous caustic alkali produced by a membrane cell process by using a single or multiple effect evaporator system in which the vapor flows in a counter direction to the aqueous caustic alkali flow and the heat recovered from the catholyte circulation line is used as part of the concentration process. In one embodiment, a catholyte heat recovery heat exchanger and flash evaporation chamber are located after the last effect of a multiple effect evaporator system. In another embodiment, the catholyte heat recovery heat exchanger and flash evaporation chamber are located prior to the single or multiple effect evaporator system. In yet another embodiment, the catholyte heat recovery process is used in conjunction with additional heat exchanger processes to further concentrate the final product as desired.

11 Claims, 13 Drawing Sheets

Related U.S. Application Data continuation of application No. 12/221,878, filed on Aug. 7, 2008, now Pat. No. 8,317,994.

(51) Int. Cl.
    *C25B 15/08*     (2006.01)
    *C01D 1/40*     (2006.01)
    *C25B 1/16*     (2006.01)
    *C02F 1/04*     (2006.01)
    *C25B 1/46*     (2006.01)

(52) U.S. Cl.
    CPC ................ *C02F 1/048* (2013.01); *C25B 1/16* (2013.01); *C25B 1/46* (2013.01); *Y02P 20/124* (2015.11); *Y02P 20/57* (2015.11); *Y02P 70/34* (2015.11)

(56) References Cited

U.S. PATENT DOCUMENTS

| | | |
|---|---|---|
| 4,459,188 A | 7/1984 | Rutherford et al. |
| 6,309,530 B1 | 10/2001 | Rutherford et al. |
| 8,317,994 B2 * | 11/2012 | Davis ...................... C01D 1/40 204/274 |

\* cited by examiner

STREAM TABLE

| Stream Number | | 1 | 2 | 3 | 4 | 5 | 6 | 7 |
|---|---|---|---|---|---|---|---|---|
| Stream Name | | L1A | L2A | L3A | L4A | L5A | L6A | L7A |
| Description | | Cell Liquor | Liquor From Third Effect | Liquor From Second Effect Condensate Preheater | Liquor From 2nd Steam Condensate Preheater | Liquor From 2nd Product Preheater | Liquor From Second Effect | Liquor From 1st Steam Condensate Preheater |
| Liquor Composition | | | | | | | | |
| NaOH | Fraction | 0.320 | 0.357 | 0.406 | 0.406 | 0.406 | 0.449 | 0.449 |
| Liquor Flow | | | | | | | | |
| NaOH | lb/hr | 93,333 | 93,333 | 20,309 | 20,309 | 73,024 | 93,333 | 29,169 |
| H2O | lb/hr | 198,333 | 168,249 | 29,691 | 29,691 | 106,760 | 114,652 | 35,831 |
| Total | lb/hr | 291,666 | 261,582 | 50,000 | 50,000 | 179,785 | 207,985 | 65,000 |
| Temperature | deg. F | 190 | 148 | 194 | 226 | 229 | 215 | 287 |
| Specific Gravity | | 1.300 | 1.36 | 1.39 | 1.39 | 1.39 | 1.45 | 1.45 |
| Normal Flow | gal/min | 448.7 | 384.7 | 71.9 | 71.9 | 258.7 | 286.9 | 89.7 |
| Pressure (Abs) | psia | | | | | | | |

| Stream Number | | 17 | 18 | 19 | 20 | 21 | 22 | 23 |
|---|---|---|---|---|---|---|---|---|
| Stream Name | | L17A | L18A | L19A | L20A | L21A | L22A | L23A |
| Description | | Liquor From 2nd Heating Element & Vapor Body | Liquor From 2nd Effect Circulation Pump | Liquor To 2nd Effect Heating Element | Liquor From 3rd Heating Element & Vapor Body | Liquor To 3rd Effect Heating Element | Liquor From Catholyte Heat Exchanger | Liquor To Flash Chamber |
| Liquor Composition | | | | | | | | |
| NaOH | Fraction | 0.449 | 0.449 | 0.427 | 0.357 | 0.357 | 0.406 | 0.400 |
| Liquor Flow | | | | | | | | |
| NaOH | lb/hr | 196,304 | 102,971 | 196,304 | 845,230 | 751,897 | 773,542 | 866,875 |
| H2O | lb/hr | 241,143 | 126,491 | 262,943 | 1,523,671 | 1,355,423 | 1,130,908 | 1,299,157 |
| Total | lb/hr | 437,447 | 229,463 | 459,247 | 2,368,902 | 2,107,320 | 1,904,450 | 2,166,032 |
| Temperature | deg. F | 215 | 215 | 221 | 148 | 148 | 180 | 176 |
| Specific Gravity | | 1.45 | 1.45 | 1.42 | 1.36 | 1.36 | 1.39 | 1.39 |
| Normal Flow | gal/min | 603.4 | 317 | 646.8 | 3,483.7 | 3,099 | 2,740.2 | 3,116.6 |
| Pressure (Abs) | psia | | | | | | | |

| 8 | 9 | 10 | 11 | 12 | 13 | 14 | 15 | 16 |
|---|---|---|---|---|---|---|---|---|
| L8A | L9A | L10A | L11A | L12A | L13A | L14A | L15A | L16A |
| Liquor From 1st Product Preheater | Product From First Effect | Product From 1st Product Preheater | Product From 2nd Product Preheater | Product From Product Cooler | Liquor from CHRE | Liquor From 1st Heating Element & Vapor Body | Liquor From 1st Effect Circulation Pump | Liquor To 1st Effect Heating Element |
| 0.449 | 0.500 | 0.500 | 0.500 | 0.500 | 0.406 | 0.500 | 0.500 | 0.467 |
| 64,164 | 93,333 | 93,333 | 93,333 | 93,333 | 93,333 | 152,933 | 59,600 | 152,933 |
| 78,820 | 93,333 | 93,333 | 93,333 | 93,333 | 136,452 | 152,933 | 59,600 | 174,252 |
| 142,985 | 186,666 | 186,666 | 186,666 | 186,666 | 229,785 | 305,866 | 119,200 | 327,185 |
| 285 | 320 | 260 | 180 | 120 | 157 | 320 | 320 | 298 |
| 1.45 | 1.49 | 1.49 | 1.49 | 1.49 | 1.39 | 1.490 | 1.490 | 1.46 |
| 197.2 | 250.6 | 250.6 | 250.6 | 250.6 | 330.6 | 410.6 | 160.0 | 448.2 |

| 24 | 25 | 26 | 27 | 28 | 29 | 30 | 31 | 32 |
|---|---|---|---|---|---|---|---|---|
| L24A | L25A | L26A | L27A | L28A | L29A | L30A | L31A | |
| Liquor From Flash Chamber | Liquor to 2nd Effect Condensate Preheater | Liquor to 2nd Effect Preheater | Liquor to 1st Steam Condensate Preheater | Liquor to 1st Product Preheater | Liquor Added to Cir. For 1st Effect Heating Element | Liquor Added to Cir. For 2nd Effect Heating Element | Liquor to Catholyte Heat Exchanger | |
| 0.406 | 0.406 | 0.406 | 0.449 | 0.449 | 0.449 | 0.406 | 0.406 | |
| 866,875 | 20,309 | 73,024 | 29,169 | 64,164 | 93,333 | 93,333 | 773,542 | |
| 1,267,360 | 29,691 | 106,760 | 35,831 | 78,820 | 114,652 | 136,452 | 1,130,908 | |
| 2,134,235 | 50,000 | 179,785 | 65,000 | 142,985 | 207,985 | 229,785 | 1,904,450 | |
| 157 | 157 | 157 | 215 | 215 | 286 | 228 | 157 | |
| 1.39 | 1.39 | 1.39 | 1.45 | 1.45 | 1.45 | 1.39 | 1.39 | |
| 3,447.2 | 71.9 | 258.7 | 89.7 | 197.2 | 286.9 | 330.6 | 2,740.2 | |

FROM FIG. 3A

TO FIG. 3D

FROM FIG. 3A / TO FIG. 3D

| Stream Number | | 33 | 34 | 35 | 36 | 37 | 38 | 39 |
|---|---|---|---|---|---|---|---|---|
| Stream Name | | S1A | V1A | V2A | V3A | V4A | V5A | V6A |
| Description | | Steam To First Effect | Vapor From First Effect | Vapor From Second Effect | Vapor From Third Effect | Vapor From Flash Chamber | Vapor From Process Condensate Receiver | Vapor To 3rd Effect Heating Element |
| Liquor Composition | | | | | | | | |
| NaOH | Fraction | | | | | | | |
| Liquor Flow | | | | | | | | |
| NaOH | lb/hr | | | | | | | |
| H2O | lb/hr | 35,155 | 21,319 | 21,800 | 30,084 | 31,797 | 272 | 22,072 |
| Total | lb/hr | 35,155 | 21,319 | 21,800 | 30,084 | 31,797 | 272 | 22,072 |
| Temperature | deg. F | 380 | 320 | 220 | 145 | 157 | 157 | 219 |
| Specific Gravity | | | | | | | | |
| Normal Flow | gal/min | | | | | | | |
| Pressure (Abs) | psia | 194.7 | 24.1 | 3.9 | 1.13 | 1.04 | 3.9 | 3.9 |

| Stream Number | | 49 | 50 | 51 | 52 | 53 | 54 | 55 |
|---|---|---|---|---|---|---|---|---|
| Stream Name | | CW1A | CW2A | CW3A | CW4A | CW5A | CW6A | CATH1A |
| Description | | Cooling Water To Surface Condenser | Cooling Water To 2nd Surface Condensater | Cooling Water From 2nd Surface Condenser | Cooling Water From Surface Condenser | Cooling Water To Product Cooler | Cooling Water From Product Cooler | Catholyte to CHRE |
| Liquor Composition | | | | | | | | |
| NaOH | Fraction | | | | | | | 0.320 |
| Liquor Flow | | | | | | | | |
| NaOH | lb/hr | | | | | | | 1,289,756 |
| H2O | lb/hr | | | | | | | 606,944 |
| Total | lb/hr | | | | | | | 1,896,700 |
| Temperature | deg. F | 85 | 85 | 95 | 96 | 85 | 102 | 190 |
| Specific Gravity | | | | | | | | 1.300 |
| Normal Flow | gal/min | 6,000 | 7,000 | 7,000 | 6,000 | 1,000 | 1,000 | 2,918 |
| Pressure (Abs) | psia | | | | | | | |

*FIG. 3C*

FROM FIG. 3B

| 40 C1A Condensate From First Effect | 41 C2A Condensate From 1st Steam Condensate Preheater | 42 C3A Condensate From 2nd Steam Condensate Preheater | 43 C4A Condensate From Second Effect | 44 C5A Condensate From Second Effect Cond. Preheater | 45 C6A Condensate From Third Effect | 46 C7A Condensate From Surface Condenser | 47 C8A Process Condensate From Evaporator | 48 C9A Condensate From 2nd Surface Condenser |
|---|---|---|---|---|---|---|---|---|
| | | | | | | | | |
| 35,155 | 35,155 | 35,155 | 21,319 | 21,319 | 22,072 | 30,084 | 105,000 | 31,797 |
| 35,155 | 35,155 | 35,155 | 21,319 | 21,319 | 22,072 | 30,084 | 105,000 | 31,797 |
| 362 | 250 | 210 | 237 | 167 | 155 | 105 | 126 | 105 |
| 0.905 | 0.943 | 0.959 | 0.947 | 0.970 | 0.978 | 0.990 | 0.981 | 0.990 |
| 77.7 | 74.6 | 73.3 | 45.0 | 44.0 | 45.1 | 60.8 | 214.1 | 64.2 |
| | | | | | | | | |
| 56 CATH2A Catholyte From CHRE | 57 | 58 | 59 | 60 | 61 | 62 | 63 | 64 |
| | | | | | | | | |
| 0.320 | | | | | | | | |
| 1,289,756 | | | | | | | | |
| 606,944 | | | | | | | | |
| 1,896,700 | | | | | | | | |
| 167 | | | | | | | | |
| 1,300 | | | | | | | | |
| 2,918 | | | | | | | | |

FROM FIG. 3C

*FIG. 3D*

STREAM TABLE

| Stream Number | | 1 | 2 | 3 | 4 | 5 | 6 | 7 |
|---|---|---|---|---|---|---|---|---|
| Stream Name | | L1B | L2B | L3B | L4B | L5B | L6B | L7B |
| Description | | Cell Liquor | Liquor From Third Effect | Liquor From Second Effect Condensate Preheater | Liquor From 2nd Steam Condensate Preheater | Liquor From 2nd Product Preheater | Liquor From Second Effect | Liquor From 1st Steam Condensate Preheater |
| Liquor Composition | | | | | | | | |
| NaOH | Fraction | 0.320 | 0.400 | 0.400 | 0.400 | 0.400 | 0.442 | 0.442 |
| Liquor Flow | | | | | | | | |
| NaOH | lb/hr | 93,333 | 93,333 | 20,004 | 20,004 | 73,329 | 93,333 | 39,754 |
| H2O | lb/hr | 198,333 | 139,949 | 29,996 | 29,996 | 109,953 | 117,966 | 50,246 |
| Total | lb/hr | 291,666 | 233,282 | 50,000 | 50,000 | 183,282 | 211,299 | 90,000 |
| Temperature | deg. F | 190 | 157 | 197 | 231 | 240 | 226 | 296 |
| Specific Gravity | | 1.30 | 1.40 | 1.40 | 1.40 | 1.40 | 1.42 | 1.42 |
| Normal Flow | gal/min | 448.7 | 333.3 | 71.4 | 71.4 | 261.8 | 297.6 | 126.8 |
| Pressure (Abs) | psia | | | | | | | |

| Stream Number | | 17 | 18 | 19 | 20 | 21 | 22 | 23 |
|---|---|---|---|---|---|---|---|---|
| Stream Name | | L17B | L18B | L19B | L20B | L21B | L22B | L23B |
| Description | | Liquor From 2nd Heating Element & Vapor Body | Liquor From 2nd Effect Circulation Pump | Liquor To 2nd Effect Heating Element | Liquor From 3rd Heating Element & Vapor Body | Liquor To 3rd Effect Heating Element | Liquor To Flash Chamber | Liquor From Flash Chamber |
| Liquor Composition | | | | | | | | |
| NaOH | Fraction | 0.442 | 0.442 | 0.433 | 0.400 | 0.400 | 0.371 | 0.371 |
| Brine Flow | | | | | | | | |
| NaOH | lb/hr | 466,454 | 373,121 | 466,454 | 961,242 | 867,909 | 507,745 | 601,078 |
| H2O | lb/hr | 589,561 | 471,595 | 611,544 | 1,441,339 | 1,301,391 | 861,255 | 1,019,568 |
| Total | lb/hr | 1,056,014 | 844,716 | 1,077,997 | 2,402,582 | 2,169,300 | 1,369,000 | 1,620,648 |
| Temperature | deg. F | 226 | 226 | 229 | 157 | 157 | 180 | 148 |
| Specific Gravity | | 1.42 | 1.42 | 1.420 | 1.40 | 1.40 | 1.37 | 1.37 |
| Normal Flow | gal/min | 1,487 | 1,190 | 1,523 | 3,432.3 | 3,099 | 1,998.5 | 2,365.9 |
| Pressure (Abs) | psia | | | | | | | |

| | 8 | 9 | 10 | 11 | 12 | 13 | 14 | 15 | 16 |
|---|---|---|---|---|---|---|---|---|---|
| | L8B | L9B | L10B | L11B | L12B | L13B | L14B | L15B | L16B |
| | Liquor From 1st Product Preheater | Product From First Effect | Product From 1st Product Preheater | Product From 2nd Product Preheater | Product From Product Cooler | Liquor from CHRE | Liquor From 1st Heating Element & Vapor Body | Liquor From 1st Effect Circulation Pump | Liquor To 1st Effect Heating Element |
| | 0.442 | 0.500 | 0.500 | 0.500 | 0.500 | 0.371 | 0.500 | 0.500 | 0.464 |
| | 53,579 | 93,333 | 93,333 | 93,333 | 93,333 | 93,333 | 158,893 | 65,560 | 158,893 |
| | 67,720 | 93,333 | 93,333 | 93,333 | 93,333 | 158,315 | 158,893 | 65,560 | 183,525 |
| | 121,299 | 186,666 | 186,666 | 186,666 | 186,666 | 251,648 | 317,786 | 131,120 | 342,419 |
| | 298 | 320 | 260 | 158 | 120 | 148 | 320 | 320 | 306 |
| | 1.42 | 1.49 | 1.49 | 1.49 | 1.49 | 1.37 | 1.490 | 1.490 | 1.46 |
| | 170.8 | 250.6 | 250.6 | 250.6 | 250.6 | 367.4 | 426.6 | 176.0 | 469.1 |
| | 24 | 25 | 26 | 27 | 28 | 29 | 30 | 31 | 32 |
| | L24B | L25B | L26B | L27B | L28B | L29B | L30B | | |
| | Liquor to Catholyte Heat Exchanger | Liquor into 2nd Effect Condensate Preheater | Liquor into 2nd Product Preheater | Liquor to 1st Steam Condensate Preheater | Liquor to 1st Product Preheater | Liquor Added to Cir. For 1st Effect Heating Element | Liquor Added to Cir. For 2nd Effect Heating Element | | |
| | 0.371 | 0.400 | 0.400 | 0.442 | 0.442 | 0.442 | 0.400 | | |
| | 507,745 | 20,004 | 73,329 | 39,754 | 53,579 | 93,333 | 93,333 | | |
| | 861,255 | 29,996 | 109,953 | 50,246 | 67,720 | 117,966 | 139,949 | | |
| | 1,369,000 | 50,000 | 183,282 | 90,000 | 121,299 | 211,299 | 233,282 | | |
| | 148 | 157 | 157 | 226 | 226 | 297 | 238 | | |
| | 1.37 | 1.40 | 1.40 | 1.42 | 1.42 | 1.42 | 1.40 | | |
| | 1,998.5 | 71.4 | 261.8 | 126.8 | 170.8 | 297.6 | 333.3 | | |

FROM FIG. 5A / TO FIG. 5D

| Stream Number | | 33 | 34 | 35 | 36 | 37 | 38 | 39 |
|---|---|---|---|---|---|---|---|---|
| Stream Name | | S1B | V1B | V2B | V3B | V4B | V5B | V6B |
| Description | | Steam To First Effect | Vapor From First Effect | Vapor From Second Effect | Vapor From Third Effect | Vapor From Flash Chamber | Vapor From Process Condensate Receiver | Vapor To 3rd Effect Heating Element |
| Liquor Composition | | | | | | | | |
| NaOH | Fraction | | | | | | | |
| Liquor Flow | | | | | | | | |
| NaOH | lb/hr | | | | | | | |
| H2O | lb/hr | 36,490 | 24,633 | 21,983 | 18,366 | 40,018 | 0 | 21,983 |
| Total | lb/hr | 36,490 | 24,633 | 21,983 | 18,366 | 40,018 | 0 | 21,983 |
| Temperature | deg. F | 380 | 320 | 226 | 157 | 147 | 168 | 226 |
| Specific Gravity | | | | | | | | |
| Normal Flow | gal/min | | | | | | | |
| Pressure (Abs) | psia | 194.7 | 24.1 | 5.7 | 1.17 | 1.17 | 5.7 | 5.7 |

| Stream Number | | 49 | 50 | 51 | 52 | 53 | 54 | 55 |
|---|---|---|---|---|---|---|---|---|
| Stream Name | | CW1B | CW2B | CW3B | CW4B | CW5B | CW6B | CATH1B |
| Description | | Cooling Water To Surface Condenser | Cooling Water To 2nd Surface Condenser | Cooling Water From 2nd Surface Condenser | Cooling Water From Surface Condenser | Cooling Water To Product Cooler | Cooling Water From Product Cooler | Catholyte to CHRE |
| Liquor Composition | | | | | | | | |
| NaOH | Fraction | | | | | | | |
| Liquor Flow | | | | | | | | |
| NaOH | lb/hr | | | | | | | 465,296 |
| H2O | lb/hr | | | | | | | 988,754 |
| Total | lb/hr | | | | | | | 1,454,050 |
| Temperature | deg. F | 85 | 85 | 96 | 90 | 85 | 96 | 190 |
| Specific Gravity | | | | | | | | 1.300 |
| Normal Flow | gal/min | 8,000 | 8,000 | 8,000 | 8,000 | 1,000 | 1,000 | 2,237 |
| Pressure (Abs) | psia | | | | | | | |

*FIG. 5C*

FROM FIG. 5B

| | 40<br>C1B<br>Condensate From First Effect | 41<br>C2B<br>Condensate From 1st Steam Condensate Preheater | 42<br>C3B<br>Condensate From 2nd Steam Condensate Preheater | 43<br>C4B<br>Condensate From Second Effect | 44<br>C5B<br>Condensate From Second Effect Cond. Preheater | 45<br>C6B<br>Condensate From Third Effect | 46<br>C7B<br>Condensate From Surface Condenser | 47<br>C8B<br>Process Condensate From Evaporator | 48<br>C9B<br>Condensate From 2nd Surface Condenser |
|---|---|---|---|---|---|---|---|---|---|
| | 36,490 | 36,490 | 36,490 | 24,633 | 24,633 | 21,983 | 18,366 | 105,000 | 40,018 |
| | 36,490 | 36,490 | 36,490 | 24,633 | 24,633 | 21,983 | 18,366 | 105,000 | 40,018 |
| | 362 | 250 | 210 | 237 | 158 | 167 | 105 | 131 | 105 |
| | 0.905 | 0.943 | 0.959 | 0.947 | 0.978 | 0.978 | 0.990 | 0.981 | 0.990 |
| | 80.6 | 77.4 | 76.1 | 52.0 | 50.4 | 45.0 | 37.1 | 214.1 | 37.1 |
| | | 57 | 58 | 59 | 60 | 61 | 62 | 63 | 64 |

| | 56<br>CATH2B<br>Catholyte From CHRE |
|---|---|
| | 465,296 |
| | 988,754 |
| | 1,454,050 |
| | 160 |
| | 1.300 |
| | 2,237 |

FROM FIG. 5C

*FIG. 5D*

METHOD FOR CONCENTRATING AN AQUEOUS CAUSTIC ALKALI VIA SPLITTING A CATHOLYTE INTO A FIRST STREAM FOR HEAT RECOVERY AND A SECOND STREAM FOR EVAPORATION

CROSS REFERENCE TO RELATED APPLICATIONS

This application is a Divisional of U.S. patent application Ser. No. 13/650,932, filed Oct. 12, 2012, which is a Continuation of U.S. patent application Ser. No. 12/221,878, filed Aug. 7, 2008, now U.S. Pat. No. 8,317,994, issued Nov. 27, 2012. Each patent application identified above is incorporated here by reference in its entirety to provide continuity of disclosure.

FIELD OF THE INVENTION

The present invention relates to a method of recovering heat created as a by-product of one process for use as a heat source in another process. One specific example of the present invention relates to a method of recovering heat from the catholyte circulation stream from a membrane cell process to be used to reduce heating utility consumption in a multiple effect evaporation step.

BACKGROUND OF THE INVENTION

Electrolytic cells and cell membrane technologies have existed for many years. The function of electrolytic cells is to create aqueous caustic alkali products, such as caustic soda (NaOH).

The method by which the electrolytic cell creates aqueous caustic alkali products, specifically caustic soda, is as follows. Brine (or salt water) is used to create caustic soda, hydrogen gas, and chlorine gas. Referring to FIG. 1, electrolytic cell 5 has anode 15 and cathode 25 and cell membrane 30 between anode 15 and cathode 25. The use of cell membrane 30 creates anode chamber 10 and cathode chamber 20 within electrolytic cell 5.

Brine is fed into electrolytic cell 5 through line 50 into anode chamber 10. Water is fed into electrolytic cell 5 through line 35 into cathode chamber 20. When electric current flows through electrolytic cell 5, the chlorine ions in the brine water collect around anode 15 in anode chamber 10 as chlorine gas. Sodium ions from the brine collect around cathode 25 and reacts with the water to form caustic soda and hydrogen gas which collects in cathode chamber 20.

The chlorine gas and the depleted brine are removed from anode chamber 10 through line 42 and line 40, respectively.

The aqueous caustic soda (or catholyte) and hydrogen gas is removed from cathode chamber 20 through line 45 and line 44, respectively.

However, the concentration of the aqueous caustic alkali products created by the electrolytic cells is normally not high enough to meet customer demands or to be used efficiently in other processes. Therefore, the aqueous caustic alkali product must be concentrated to a concentration level greater than the catholyte concentration in order to be acceptable to sell or use in other processes. For example, many customers require their aqueous caustic soda (or NaOH) to have a concentration of approximately 50% NaOH, but the concentration of NaOH coming from the electrolytic cell is approximately 32% NaOH.

The electricity used in the electrolytic cells to create the aqueous caustic alkali products releases heat which is absorbed by the materials within the cells, thereby raising its temperature. Thus, the temperature of the catholyte from the cathode chamber of the cell and the anolyte from the anode chamber of the cell have higher temperatures than the material entering the cells. Traditionally, the catholyte removed from the cathode chamber is split into two streams, one that is circulated back to the cathode chamber along with water added for dilution, and one that is to be concentrated and sold as product or used in another process within the facility. However, before the circulated catholyte can be returned to the cell, the heat added due to the electrolysis must be removed and the temperature of the catholyte reduced. This is most often done by the use of cooling water through a heat exchanger.

Further, in order to concentrate the aqueous alkali stream, heat (typically from steam) is used to cause evaporation in order to remove the excess water. Boiling point rise is a physical property of every caustic alkali solution and increases with increased concentration and decreases with increased vacuum. Therefore, with the higher the concentration of caustic soda, the higher the temperature necessary in order to cause further evaporation of the excess water from the aqueous caustic solution.

The concentration of the aqueous caustic alkali has been done by several different methods including multiple effect evaporators, series of evaporators, or a single evaporator. Most plants use steam as a heating source in a multiple effect evaporator.

U.S. Pat. No. 4,090,932 by Kazihara discloses a method of recovering heat from the catholyte circulation line and using that as a heat source for the concentration process. However, the method disclosed will not work as described and cannot be easily modified without undue experimentation. There are several reasons why the design disclosed by Kazihara is unworkable or impracticable. Specifically, the circulated catholyte flow rate is excessive, the barometric condenser is incorrectly designed, and the catholyte heat exchanger is marginally designed.

First, the recirculated catholyte flow rate is excessive. In the disclosed process, the examples given require that the circulated catholyte flow is approximately 26 times greater than the catholyte flow to be concentrated. Current cell design requires that the circulated catholyte is less than 8 times the catholyte to be concentrated. Thus, the circulation required by the Kazihara design is more than 3 times that permitted by current cell design. The high circulated catholyte rate specified by the Kazihara design is impracticable since this flow is not acceptable for current cell technology.

Second, the barometric condenser is inadequately designed. Kazihara has either specified an incorrect Boiling Point Rise or has not allowed for a sufficient minimum temperature driving force for heat transfer for the barometric condenser. Boiling Point Rise is a physical property of any boiling liquid. Under atmospheric pressure water boils at 212° F. and the boiling temperature for 50% NaOH is 290° F., therefore, the boiling point rise of 50% NaOH is 78° F. (290° F.–212° F.). Furthermore, the water vapor evaporated under atmospheric pressure from the 50% NaOH can be condensed at 212° F. and this temperature is defined as the saturated vapor temperature (also referred to as dew point). Under high vacuum, where water boils at 95° F., the boiling temperature for 50% NaOH is 165° F. and the boiling point rise of 50% NaOH is 70° F. (165° F.–95° F.). The water vapor evaporated under this high vacuum from the 50% NaOH can be condensed at 95° F. (the saturated vapor temperature).

Kazihara specifies a boiling temperature of 74° C. (165° F.) for 50% NaOH in U.S. Pat. No. 4,090,932 FIG. 6 with the cooling water entering the barometric condenser at 30° C. (86° F.) and exiting at 34° C. (93° F.). In order to condense water vapor in a barometric condenser, the temperature difference between the exiting cooling water and the saturated vapor temperature must be at least 6° F. This indicates that Kazihara chose a Boiling Point Rise for 50% NaOH of 66° F. (165° F.–93° F.–6° F.=66° F. (37° C.)) rather than 70° F. which is supported by published data or that Kazihara selected a temperature difference between the exiting cooling water and the saturated vapor temperature of 2° F. that would use the correct Boiling Point Rise of 70° F. (165° F.–93° F.–2° F.=70° F. (37° C.)). Either the Boiling Point Rise has been incorrectly calculated or an inadequate temperature driving force has been specified. Regardless, the barometric condenser can not be designed as specified.

Third, the catholyte heat exchanger is marginally designed. Even if 50% NaOH is maintained at 165° F. (74° C.), the design disclosed by Kazihara is unworkable in practice. In FIG. 6 Kazihara specifies a catholyte temperature of 90° C. (194° F.) and a temperature to the evaporator (from the catholyte heat exchanger (6)) of 86° C. (187° F.). This means the temperature difference ($\Delta T$) on that end of the exchanger is 194° F.–187° F.=7° F. The given circulation rates indicate that indeed Kazihara expects to maintain the 7° F. $\Delta T$ on both ends of the heat exchanger. Industry standard is to maintain $\Delta T$ of at least 10° F. on each end of the catholyte heat exchanger. A catholyte heat exchanger designed with a $\Delta T$ smaller than 10° F. tends to be excessively large and also difficult to operate.

In summary, this is an unworkable design which suffers from three major problems. Furthermore, any changes to fix one of these problems makes the other problems worse. All embodiments of the invention disclosed in Kazihara suffer from similar problems because in all cases they are trying to transfer the heat from the circulated catholyte to 50% NaOH.

U.S. Pat. No. 4,105,515 by Ogawa discloses a process for electrolysis of alkali halide in which the electrolytic cell is maintained at higher than atmospheric pressures and includes a multi stage double effect evaporator to concentrate the catholyte. First, current state of the art electrolytic cells do not operate above atmospheric pressure. Second, the disclosure only allows for the NaOH to be concentrated to 43% NaOH which is not economical to be sold as a product due to transportation and handling considerations. In most instances a higher concentration, of approximately 50% NaOH, is required. Third, the procedure disclosed will not function properly or give the desired results if the cell pressure is not higher than atmospheric pressure.

The present invention allows for decreasing the amount of steam to concentrate the catholyte generated from the electrolytic cell while recovering the heat generated by the electrolytic cell and maintaining a circulation rate of approximately 8 times the rate being concentrated. The first embodiment of this invention further allows for increased production when using prior equipment.

SUMMARY OF THE INVENTION

Sodium hydroxide (NaOH), also known as caustic soda, is used in many industries, some of which include the manufacture of pulp and paper, textiles, drinking water, soaps, and detergents. It is also the most used base in chemical laboratories. Caustic soda can either be sold as an aqueous solution or as a solid. Due to transportation and handling considerations, most caustic soda is sold as an aqueous solution which is at least 50% NaOH.

One method of creating an aqueous solution is through the use of a membrane cell process in which a cation membrane is between a cathode and anode within the cell. Brine is fed into the cell in the anode chamber and water is fed into the cathode chamber. When electricity goes through the cell, the sodium chloride (NaCl) within the brine is separated and the chloride ions collect around the anode and the sodium ions pass through the cation membrane and collect around the cathode. After passing through the membrane, the sodium ions react with the water to form hydrogen gas and caustic soda. The chloride ions at the anode form chlorine gas.

Current membrane cell technology has determined that effective cell operation results in catholyte of aqueous caustic soda of approximately 32% NaOH and an approximate temperature of 190° F. The exit temperature of the catholyte is higher than the entrance temperature of the brine and water because of the absorption of heat generated by the electricity through the cathode and anode. Further, effective membrane cell operation provides for a circulation line in which a portion of the catholyte removed from the cell is returned to the cell. This circulation rate should be less than 8 times the rate removed for concentration. However, prior to reintroduction to the cell, the circulated catholyte must be cooled to remove the added heat.

While part of the catholyte is being circulated back to the cell, the rest will be concentrated by removing the excess water. The concentration process is accomplished through a single or multiple effect evaporator system and a catholyte heat recovery evaporator step. Current evaporator technology has determined that a maximum of three effects can be used to concentrate catholyte to approximately 50% NaOH. The catholyte heat recovery evaporator step includes one or more heat exchangers, one or more flash chambers, and/or one or more evaporator bodies along with a surface condenser or barometric condenser.

In one embodiment, the catholyte to be concentrated flows through the third effect of the triple effect evaporator, through the catholyte heat recovery evaporator step, through the second effect evaporator, and then through the first effect evaporator. Through each effect and the catholyte heat recovery evaporator, water is evaporated and the concentration of NaOH is increased. During each effect and the catholyte heat recovery evaporator step, the catholyte is heated to evaporate the water.

In the first effect, the heat source is condensing steam. In the second effect, the heat source is the condensing water vapor released from the first effect. In the third effect, the heat source is the condensing water vapor released from the second effect. In the catholyte heat recovery evaporator step, the heat source is the circulating catholyte. Therefore, the released vapors and the aqueous caustic soda are flowing in opposite directions to each other.

Further, the 50% NaOH from the first effect is used as a heat source for preheater heat exchangers of the aqueous caustic soda going into the first effect and going into the second effect. The steam condensed from the first effect is used as a heat source for preheater heat exchangers for the aqueous caustic soda going into the first effect and going into the second effect. The water vapor that had been condensed from the second effect is used as a heat source for a preheater heat exchanger for the aqueous caustic soda going into the second effect.

By recovering heat from the circulation line of the catholyte back to the cell, and the condensate lines from the effects, heating costs for the entire process are reduced.

Further, by adding the catholyte heat recovery evaporation to an existing evaporator system, the amount of evaporation needed from each effect to reach the desired concentration is reduced, thereby increasing the potential to increase production when compared to the system without the catholyte heat recovery evaporator step.

In another embodiment, the catholyte heat recovery evaporator step is prior to the third effect. The catholyte to be concentrated enters a flash chamber which reduces the boiling temperature as the pressure is reduced allowing vapor to be removed and is further heated by a circulation line for the flash chamber that is heated by the catholyte circulating back to the membrane cell. With this configuration, the potential to increase production in an existing evaporator system is more difficult because additional heat transfer area must be added because of the increase in boiling point rise in all effects. This embodiment would be most beneficial if retrofitting an existing plant where the evaporation portion of the process is not located close to the cells.

In yet another embodiment, the catholyte heat recovery evaporator step is used as the initial step in conjunction with other heat exchanger processes well known in the art to further concentrate the final product to the desired concentration to produce concentrations greater than 50%, including both 70% and 100% commercial grades of caustic soda.

BRIEF DESCRIPTION OF THE DRAWINGS

FIG. 3A is a mass balance for the embodiment of the invention shown in FIG. 2.

FIG. 3B is a mass balance for the embodiment of the invention shown in FIG. 2.

FIG. 3C is a mass balance for the embodiment of the invention shown in FIG. 2.

FIG. 3D is a mass balance for the embodiment of the invention shown in FIG. 2.

FIG. 5A is a mass balance for the embodiment of the invention shown in FIG. 4.

FIG. 5B is a mass balance for the embodiment of the invention shown in FIG. 4.

FIG. 5C is a mass balance for the embodiment of the invention shown in FIG. 4.

FIG. 5D is a mass balance for the embodiment of the invention shown in FIG. 4.

DETAILED DESCRIPTION OF THE PREFERRED EMBODIMENT

One way that aqueous alkali and aqueous caustic alkali are produced is through the use of cell membranes. The preferred feed materials to electrolytic cells include KCl (potassium chloride) producing KOH (also known as caustic potash) and NaCl (sodium chloride) producing caustic soda. Since NaCl is the most preferred feed material, caustic soda will be used to describe the method of use for the invention; however, other alkalis and caustic alkalis may be substituted. Other alkali metals include: lithium, rubidium, cesium, and francium.

Figure 1:
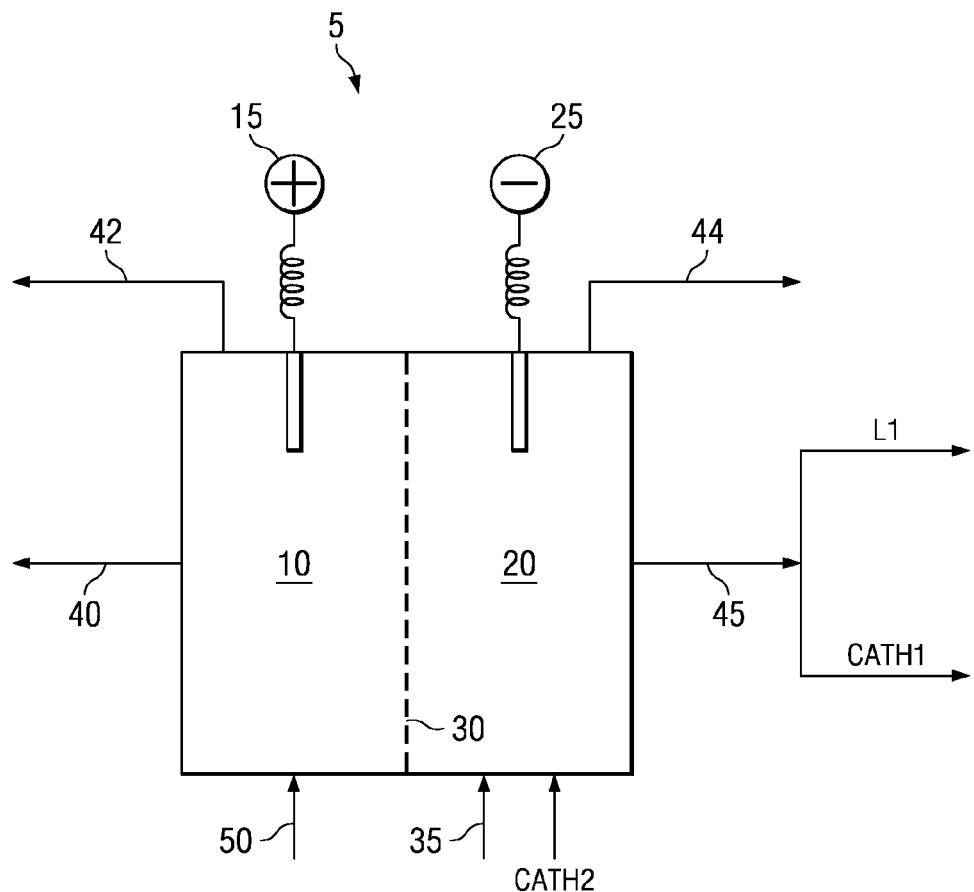
FIG. 1 is a flow sheet for a typical electrolytic cell as used in the invention.

The creation of caustic soda through use of cell membranes is known in the art as discussed in relation to FIG. 1. Due to the electric current passing through electrolytic cell 5, the temperature of the contents in anode chamber 10 and cathode chamber 20 are elevated.

The catholyte removed from cathode chamber 20 is split into a concentration stream and circulation stream. The concentration stream flows through line L1. The circulation stream flows through line CATH1 and is eventually fed back into cathode chamber 20 through line CATH2. The circulation stream flow rate through line CATH1 should equal to or less than eight times the concentration stream flow rate through line L1. During the circulation process, heat absorbed by the catholyte while in electrolytic cell 5 is released.

Figure 2A:
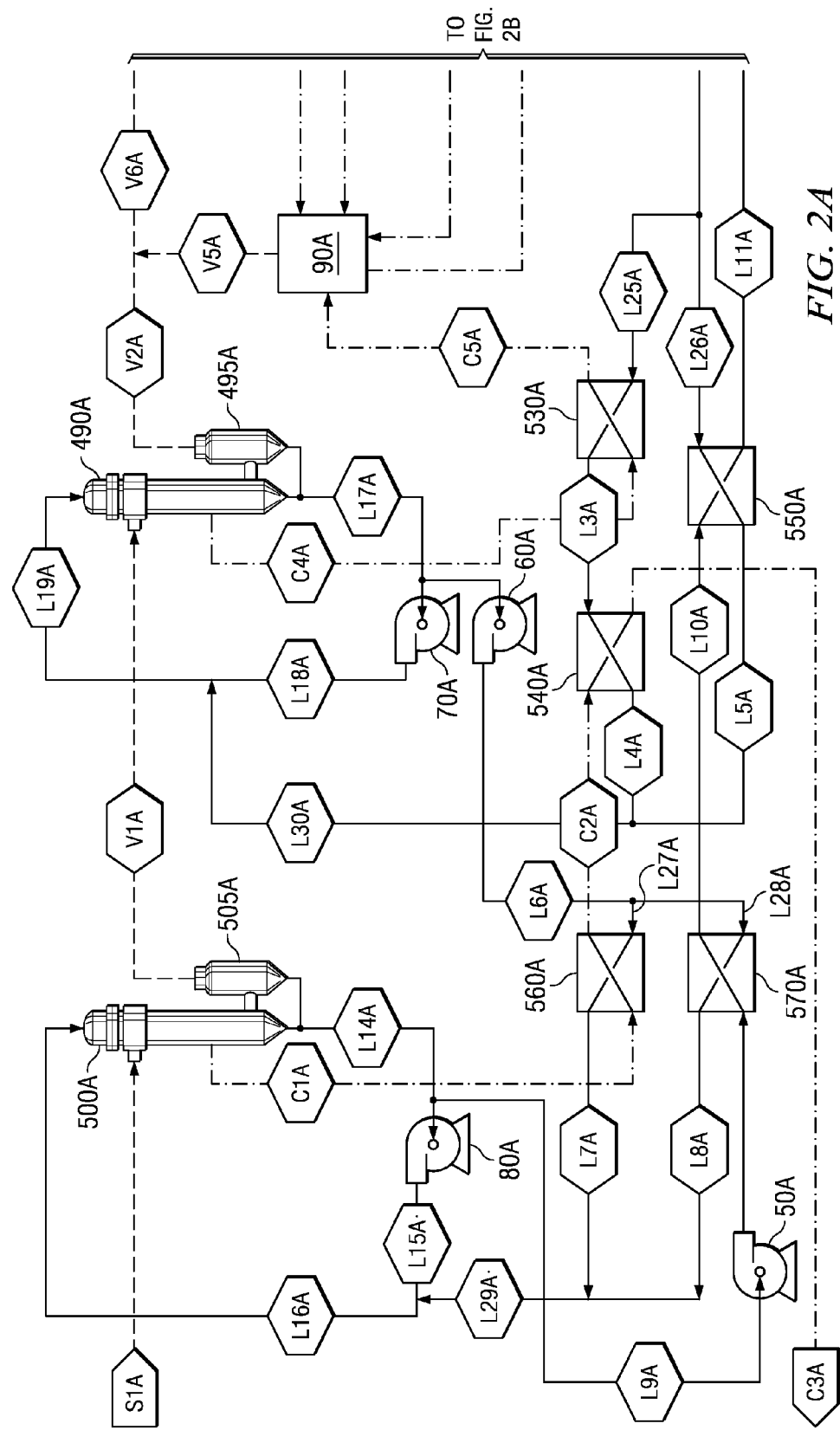
FIG. 2A is a flow sheet for one embodiment of this invention.
Figure 2B:
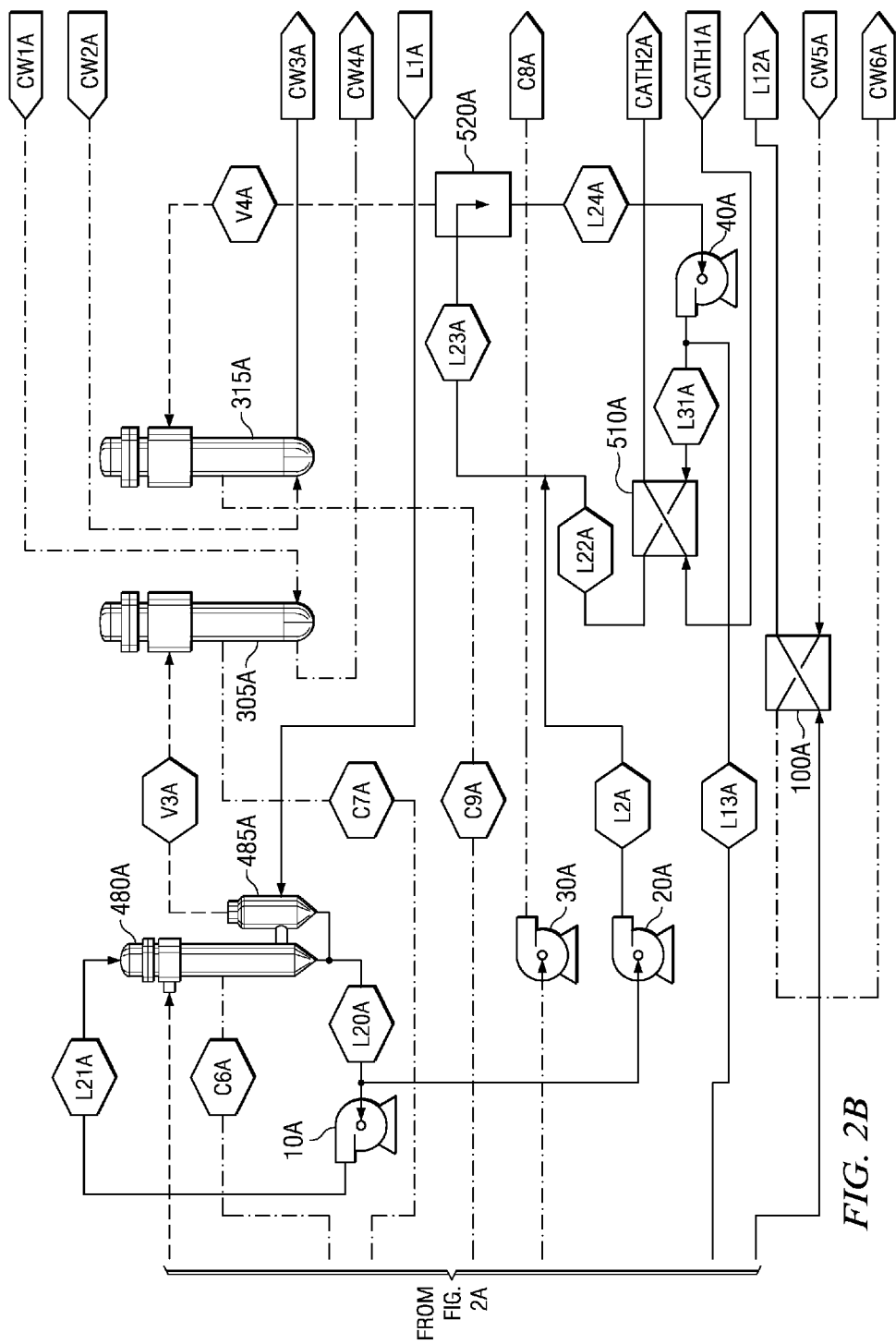
FIG. 2B is a flow sheet for one embodiment of this invention.

FIGS. 2A and 2B describe one embodiment of the invention by which the heat from the circulation stream is recovered and the aqueous caustic soda in the concentration stream is concentrated. FIGS. 3A-3D are a table which illustrates an example of a mass balance for the embodiment illustrated in FIGS. 2A and 2B for the production of 1,000 ECU (Electrochemical Units) (which amounts to approximately 1,000 short tons per day of chlorine and approximately 1,120 short tons per day of caustic soda). In this embodiment, the calculated values have been rounded off to approximate values.

Referring to FIGS. 2A and 2B, the catholyte removed from cathode chamber 20 in FIG. 1 is split and flows through line L1A and line CATH1A. The catholyte in line L1A will be concentrated while the catholyte in line CATH1A is circulated back to cathode chamber 20. Approximately 7 times the catholyte in line L1A is circulated through line CATH1A.

In this embodiment, the catholyte to be concentrated will go through a three effect evaporation system and a catholyte heat recovery evaporator step; however, this invention could be practiced with either a double effect or single effect evaporation system.

Line L1A is connected to third effect vapor body 485A, which is connected to third effect heating element 480A. The aqueous caustic soda flowing in line L1A has a temperature of approximately 190° F., a flow rate of approximately 291,700 lbs/hr and a concentration of approximately 32% caustic soda by weight.

Third effect heating element 480A and third effect vapor body 485A can be constructed of stainless steel.

The heat source for third effect heating element 480A is the vapor produced from second effect vapor body 495A which flows through vapor line V2A and vapor from process condensate receiver 90A which flows through vapor line V5A. Vapor lines V5A and V2A combine to form line V6A which is connected to third effect heating element 480A. The vapor in vapor line V2A has an approximate temperature of 220° F., an approximate pressure of 3.9 psia and an approximate flow rate of 21,800 lbs/hr. The vapor flowing through vapor line V5A is small in comparison to the vapors in vapor line V2A and is primarily intended to recover heat which was not recovered in the second effect condensate preheater 530A. The flow rate of the vapor in vapor line V5A is approximately 300 lbs/hr with a temperature of approximately 157° F. and an approximate pressure of 3.9 psia. Therefore, the approximate temperature, and flow rate of the vapor in vapor line V6A is approximately 22,100 lbs/hr with an approximate temperature of 219° F. and an approximate pressure of 3.9 psia.

The vapor from vapor line V6A, after being condensed, exits third effect heating element 480A through condensate line C6A, which is also connected to process condensate receiver 90A. The condensate in condensate line C6A has an approximate temperature of 155° F. and an approximate flow rate of 22,100 lbs/hr.

The vapor released in third effect vapor body 485A due to concentration of the aqueous caustic soda exits through vapor line V3A. The vapor in vapor line V3A has an approximate temperature of 145° F., an approximate pressure of 1.13 psia and an approximate flow rate of 30,100 lbs/hr.

The concentrated aqueous caustic soda exits third effect heating element 480A and third effect vapor body 485A through line L20A at an approximate flow rate of 2,368,900 lbs/hr, an approximate temperature of 148° F., and an approximate concentration of 35.7% caustic soda by weight.

Line L20A splits into two lines L2A and L21A. Line L21A is a circulation line for third effect heating element 480A. The aqueous caustic soda in line L21A is pumped through pump 10A at an approximate flow rate of 2,107,300 lbs/hr and re-enters third effect heating element 480A creating a circulation stream. The concentrated aqueous caustic soda in line L2A has an approximate temperature of 148° F., an approximate flow rate of 261,600 lbs/hr, and an approximate concentration of 35.7% caustic soda by weight.

Line L2A joins with line L22A to create line L23A. The aqueous caustic soda in line L2A is pumped through pump 20A.

The aqueous caustic soda in line L23A enters flash chamber 520A with an approximate concentration of 40% caustic soda, an approximate flow rate of 2,166,000 lbs/hr, and an approximate temperature of 176° F. The aqueous caustic soda that enters flash chamber 520A is concentrated as vapor is released. The released vapor leaves flash chamber 520A through vapor line V4A. The concentrated caustic soda leaves flash chamber 520A through line L24A at an approximate concentration of 40.6% caustic soda, an approximate flow rate of 2,134,200 lbs/hr, and an approximate temperature of 157° F. The vapor in vapor line V4A has an approximate temperature of 157° F., an approximate pressure of 1.04 psia and an approximate flow rate of 31,800 lbs/hr.

The aqueous caustic soda in line L24A is pumped through pump 40A prior to splitting into line L31A and line L13A.

Line L31A is connected to catholyte heat exchanger 510A. The aqueous caustic soda in line L31A enters catholyte heat exchanger 510A at an approximate flow rate of 1,904,500 lbs/hr and an approximate temperature of 157° F. and exits through line L22A with an elevated temperature of approximately 180° F. Line L22A joins with line L2A to form line L23A which is connected to flash chamber 520A.

The heat source for catholyte heat exchanger 510A is the catholyte being circulated back to cathode chamber 20, shown in FIG. 1, at an approximate flow rate of 2,900 gal/min (or approximately 1,896,700 lbs/hr). The catholyte enters catholyte heat exchanger 510A through line CATH1A with an approximate temperature of 190° F. and exits through line CATH2A with an approximate temperature of 167° F. The catholyte is cooled as it progresses through catholyte heat exchanger 520A. Line CATH2A transports the cooled catholyte back to electrolytic cell 5 and cathode chamber 20.

As stated previously, line L24A splits into lines L31A and L13A. The aqueous caustic soda to be further concentrated flows through line L13A. The aqueous caustic soda in line L13A has an approximate temperature of 157° F., an approximate flow rate of 229,800 lb/hr, and an approximate concentration of 40.6% NaOH. Line L13A splits into lines L25A and L26A. Line L25A is connected to second effect condensate preheater 530A and the flow rate of the aqueous caustic soda is approximately 50,000 lbs/hr. The concentrated aqueous caustic soda flowing through line L25A is heated in second effect condensate preheater 530A and exits through line L3A.

The aqueous caustic soda in Line L3A has an approximate flow rate of 50,000 lbs/hr, an approximate temperature of 194° F. and an approximate concentration of 40.6% NaOH. Line L3A is connected to second steam condensate preheater 540A. Concentrated aqueous caustic soda which goes into second steam condensate preheater 540A is heated and exits through line L4A. The temperature of the aqueous caustic soda in line L4A is approximately 226° F.

The heat source for second effect condensate preheater 530A is the condensed vapor from second effect heating element 490A which exits second effect heating element 490A through condensate line C4A. The condensed vapor enters second effect condensate preheater 530A through condensate line C4A and exits through condensate line C5A. Condensate line C5A connects to process condensate receiver 90A. The condensed vapor flowing through condensate lines C4A and C5A have an approximate flow rate of 21,300 lbs/hr of water. The approximate temperature of the condensed vapor in condensate line C4A is 237° F. which is cooled to approximately 167° F. when it reaches condensate line C5A.

The heat source for second steam condensate preheater 540A is the condensed steam from first effect heating element 500A after it has proceeded through first steam condensate preheater 560A. The condensed steam enters second steam condensate preheater 540A through condensate line C2A and exits second steam condensate preheater 540A through condensate line C3A. The condensed steam enters second steam condensate preheater 540A with an approximate temperature of 250° F. and an approximate flow rate of 35,200 lbs/hr and exits at an approximate temperature of 210° F.

The concentrated aqueous caustic soda in line L26A flows through second product preheater 550A at a flow rate of approximately 179,800 lbs/hr. The temperature of the concentrated aqueous caustic soda in line L26A is elevated and exits second product preheater 550A through line L5A. The temperature of the aqueous caustic soda in line L5A is approximately 229° F. and the flow rate of the aqueous caustic soda is approximately 179,800 lbs/hr.

The heat source for second product preheater 550A is the final product aqueous caustic soda. The final product aqueous caustic soda has an elevated temperature due to the concentration process. By using second product preheater 550A, the heat used to create the final product aqueous caustic soda is recovered to assist in the concentration of other aqueous caustic soda. The final product aqueous caustic soda enters second product preheater 550A through line L10A and exits through line L11A. The approximate flow rate of the final product aqueous caustic soda (50% NaOH) is approximately 186,700 lbs/hr through lines L10A and L11A. The temperature of the final product aqueous caustic soda decreases from approximately 260° F. in line L10A to approximately 180° F. in line L11A.

Line L5A and L4A are joined into line L30A. Line L30A contains concentrated aqueous caustic soda which will be concentrated further. The aqueous caustic soda in line L30A has an approximate temperature of 228° F., an approximate flow rate of 229,800 lbs/hr, and an approximate concentration of 40.6% caustic soda by weight. Line L30A joins with line L18A, which is a circulation line for second effect heating element 490A, to form line L19A. The aqueous caustic soda in Line L18A has an approximate flow rate of 229,500 lbs/hr, an approximate temperature of 215° F., and an approximate concentration of 44.9% caustic soda by weight. When line L18A joins with line L30A, the aqueous caustic soda flowing through line L19A has an approximate flow rate of 459,200 lbs/hr, an approximate temperature of 221° F., and an approximate concentration of 42.7% caustic soda by weight.

Line L19A is connected to second effect heating element 490A. Second effect heating element 490A is connected to second effect vapor body 495A. In second effect heating element 490A, the aqueous caustic soda is heated to increase its temperature and vaporize water contained therein. The water which is vaporized exits second effect vapor body 495A, through vapor line V2A. As a result of the vaporization, the aqueous caustic soda becomes more concentrated.

The heat source for second effect heating element 490A is the vapor created from the concentration of the aqueous caustic soda and released from first effect vapor body 505A. The vapor enters second effect heating element 490A through vapor line V1A and, after being condensed, exits through condensate line C4A. As stated previously, the condensed vapor from second effect heating element 490A exits through condensate line C4A and flows through second effect condensate preheater 530A in order to heat a portion of the caustic flowing to second effect heating element 490A. The temperature of the water vapor in vapor line V1A is approximately 320° F. at an approximate pressure of 24.1 psia and the vapor has an approximate flow rate of 21,300 lbs/hr.

The vapor released from the concentration process exits second effect vapor body 495A through vapor line V2A. The vapor is used as the heat source for third effect heating element 480A and enters third effect heating element 480A through vapor line V6A.

The concentrated aqueous caustic soda leaves second effect heating element 490A and second effect vapor body 495A through line L17A with an approximate flow rate of 437,400 lbs/hr, an approximate temperature of 215° F., and an approximate concentration of 44.9% caustic soda by weight.

Line L17A splits into line L6A and line L18A. Line L18A connects with line L30A to circulate back to second effect heating element 490A. The aqueous caustic soda in line L18A is pumped through pump 70A.

Line L6A contains aqueous caustic soda that is being further concentrated through the first effect. The aqueous caustic soda in line L6A has a flow rate of approximately 208,000 lbs/hr and a temperature of approximately 215° F. The approximate concentration of caustic soda in the aqueous caustic soda in line L6A is 44.9%. Line L6A splits into two lines, line L27A and line L28A, and the aqueous caustic soda flowing through these lines is split into approximately 65,000 lbs/hr in line L27A and approximately 143,000 lbs/hr in line L28A. The aqueous caustic soda flowing in line L6A is pumped by pump 60A.

Line L27A is connected to first steam condensate preheater 560A. The concentrated aqueous caustic soda flowing through line L27A enters first steam condensate preheater 560A and is heated. The concentrated aqueous caustic soda exits first steam condensate preheater 560A through line L7A at a flow rate of approximately 65,000 lbs/hr and a temperature of approximately 287° F.

The heat source for first steam condensate preheater 560A is the condensed steam from first effect heating element 500A. The condensed steam enters through condensate line C1A and exits through condensate line C2A. The flow rate of the condensed steam is approximately 35,200 lbs/hr and is reduced from approximately 362° F. to approximately 250° F. as it flows through first steam condensate preheater 560A. While the condensed steam is cooled as it proceeds through first steam condensate preheater 560A, the concentrated aqueous caustic soda is heated.

Line L28A connects to first product preheater 570A. The concentrated aqueous caustic soda enters first product preheater 570A through line L28A, is heated, and exits through line L8A with an approximate temperature of 285° F. The heat source for first product preheater 570A is the final product aqueous caustic soda from first effect heating element 500A and first effect vapor body 505A which has completed the concentration process. The final product aqueous caustic soda enters first product preheater 570A through line L9A, is cooled, and exits through line L10A. The final product aqueous caustic soda is pumped into first product preheater by pump 50A.

The concentrated aqueous caustic soda flowing through first product preheater 570A has a flow rate of approximately 143,000 lbs/hr and enters at approximately 215° F. and exits at approximately 285° F. The final product aqueous caustic soda enters first product preheater 570A at an approximate temperature of 320° F. and exits at an approximate temperature of 260° F. The flow rate of the final product caustic soda is approximately 186,700 lbs/hr.

Line L7A and line L8A are joined to create line L29A. Line L29A joins with line L15A to form line L16A. Line L16A connects to first effect heating element 500A. The aqueous caustic soda in line L29A has an approximate flow rate of 208,000 lbs/hr and approximate temperature of 286° F. When the aqueous caustic soda from line L29A joins with the aqueous caustic soda from line L15A, which has an approximate flow rate of 119,200 lbs/hr, an approximate temperature of 320° F., and an approximate concentration of 50% caustic soda, the resulting aqueous caustic soda has an approximate flow rate of 327,200 lbs/hr, an approximate temperature of 298° F., and an approximate concentration of 46.7% caustic soda and is flowing through line L16A.

First effect heating element 500A is connected to first effect vapor body 505A. Water vapor is released from the concentrated aqueous caustic soda thereby further concentrating the aqueous caustic soda into the final concentration of caustic soda to be sold or used in other processes. The final product aqueous caustic soda exits first effect heating element 500A and first effect vapor body 505A through line L14A. The aqueous caustic soda flowing through line L14A has an approximate concentration of 50% caustic soda, an approximate flow rate of 305,900 lbs/hr, and an approximate temperature of 320° F.

The water vapor released during the concentration of the caustic soda exits first effect vapor body 505A through vapor line V1A. The vapor is used as the heat source for the second effect heating element 490A.

The heat source for first effect heating element 500A is steam and enters first effect heating element 500A through steam line S1A at an approximate flow rate of 35,200 lbs/hr, a pressure of approximately 194.7 psia and temperature of approximately 380° F. The condensed steam exits first effect heating element 500A through condensate line C1A. As previously discussed, the condensed steam is further used to heat the feeds going into first effect heating element 500A and second effect heating element 490A.

Line L14A is split into line L15A and line L9A. Line L15A is a portion of a circulation line for first effect heating element 500A. It is connected to line L29A to form line L16A which is connected to first effect heating element 500A. The aqueous caustic soda which flows through line L15A is pumped by pump 80A.

The final product aqueous caustic soda is cooled through first product preheater 570A and second product preheater 550A. However, it should still be cooled further. Therefore, the final product aqueous caustic soda flows through product cooler 100A. Line L11A which is connected to exit of second product preheater 550A is also connected to product cooler 100A. After the final product aqueous caustic soda flows through product cooler 100A, it exits through line L12A and has a temperature of approximately 120° F. The cooling source for product cooler 100A is cooling water. The cooling water enters through cooling water line CW5A at an approximate flow rate of 1,000 gal/min and an approximate temperature of 85° F. and exits through cooling water line CW6A with an approximate temperature of 102° F.

The vapor released from third effect vapor body 485A travels through vapor line V3A into surface condenser 305A where the vapor is cooled and condensed. A barometric condenser could also be used for this service. The cooling source for surface condenser 305A is cooling water which enters surface condenser 305A through cooling water line CW1A with an approximate flow rate of 6,000 gal/min and an approximate temperature of 85° F. The cooled and condensed vapor exits surface condenser 305A through condensate line C7A at an approximate flow rate of 30,100 lbs/hr and an approximate temperature of 105° F. Condensate line C7A is connected to process condensate receiver 90A.

The cooling water that has been heated as it proceeded through surface condenser 305A exits through cooling water line CW4A with an approximate temperature of 96° F. The vapor released from flash chamber 520A exits flash chamber 520A through vapor line V4A. Vapor line V4A connects to second surface condenser 315A. A barometric condenser could also be used for this service. Vapor enters second surface condenser 315A and is condensed by cooling water that enters second surface condenser 315A through cooling water line CW2A at an approximate flow rate of 7,000 gal/mm and an approximate temperature of 85° F.

The cooling water is heated as it proceeds through second surface condenser 315A exits through cooling water line CW3A with an approximate temperature of 95° F.

The condensed vapor exiting second surface condenser 315A exits through condensate line C9A. Condensate line C9A is connected to process condensate receiver 90A. Condensate flowing through condensate line C9A has an approximate flow rate of 31.800 lbs/hr and an approximate temperature of 105° F.

Process condensate receiver 90A collects condensate from the different effects and stages of the evaporation process. Any remaining vapor contained in condensate lines C5A, C9A, C7A, or C6A is released from process condensate receiver through vapor line V5A and is used as a heat source for third effect heating element 480A.

The condensed vapor, or water, is pumped out of process condensate receiver 90A by pump 30A through condensate line C8A at an approximate flow rate of 105,000 lbs/hr and an approximate temperature of 126° F. The water can be used many different ways within the facility, including as the water source for the electrolytic cell.

Cooling water flowing through cooling water lines CW3A, CW4A and CW6A is returned to the cooling tower to be cooled and reused in the concentration process or other cooling required at other locations within the facility.

First effect heating element 500A, first effect vapor body 505A, second effect heating element 490A, second effect vapor body 495A, second effect condensate preheater 530A, second product preheater 550A, second steam condensate preheater 540A, first steam condensate preheater 560A, and first product preheater 570A, and all lines in which aqueous caustic soda above approximately 40% NaOH flows should be constructed of a material resistant to corrosion by caustic soda, such as nickel. The flash chamber 520A, catholyte heat exchanger 510A, could be constructed of a higher nickel stainless steel or nickel.

The above example gives one embodiment which attempts to optimize the use and recovery of heat from different heat sources as part of the concentration process. However, those skilled in the art will recognize that this invention can be practiced without the use of second effect condensate preheater 530A, second steam condensate preheater 540A, second product preheater 550A, first steam condensate preheater 560A, first product preheater 570A, and product cooler 100A, or can incorporate any combination thereof.

Those skilled in the art will recognize that catholyte heat exchanger 510A can consist of two or more heat exchangers arranged in either series or parallel, and flash chamber 520A can consist of two or more flash chambers connected to two or more vapor bodies arranged in either series or parallel.

Further, those skilled in the art will recognize that the concentrations of caustic soda flowing through this one embodiment can vary in actual practice. For example, the concentration of the aqueous caustic soda flowing through line L1A can range from approximately 31.0% to approximately 33.0% caustic soda by weight. The concentration of the aqueous caustic soda flowing from third effect heating element 480A and third effect vapor body 485A and through line L2A can range from approximately 34.6% to approximately 36.8% caustic soda by weight. The concentration of the aqueous caustic soda flowing from flash chamber 520A and through line L13A can range from approximately 39.4% to approximately 41.8% caustic soda by weight. The concentration of the aqueous caustic soda flowing from second effect heating element 490A and second effect vapor body 495A and through line L6A can range from approximately 43.5% to approximately 46.3% caustic soda by weight. The concentration of the final product aqueous caustic soda flowing from first effect heating element 500A and first effect vapor body 505A and through line L9A can range from approximately 48.5% to approximately 51.5% caustic soda by weight.

Although caustic soda is most commonly sold as a 50% concentration product, this embodiment of the invention may be employed as an initial step toward achieving caustic soda concentrations greater than 50%, including the 70% and 100% commercial grades of caustic soda.

Figure 4A:
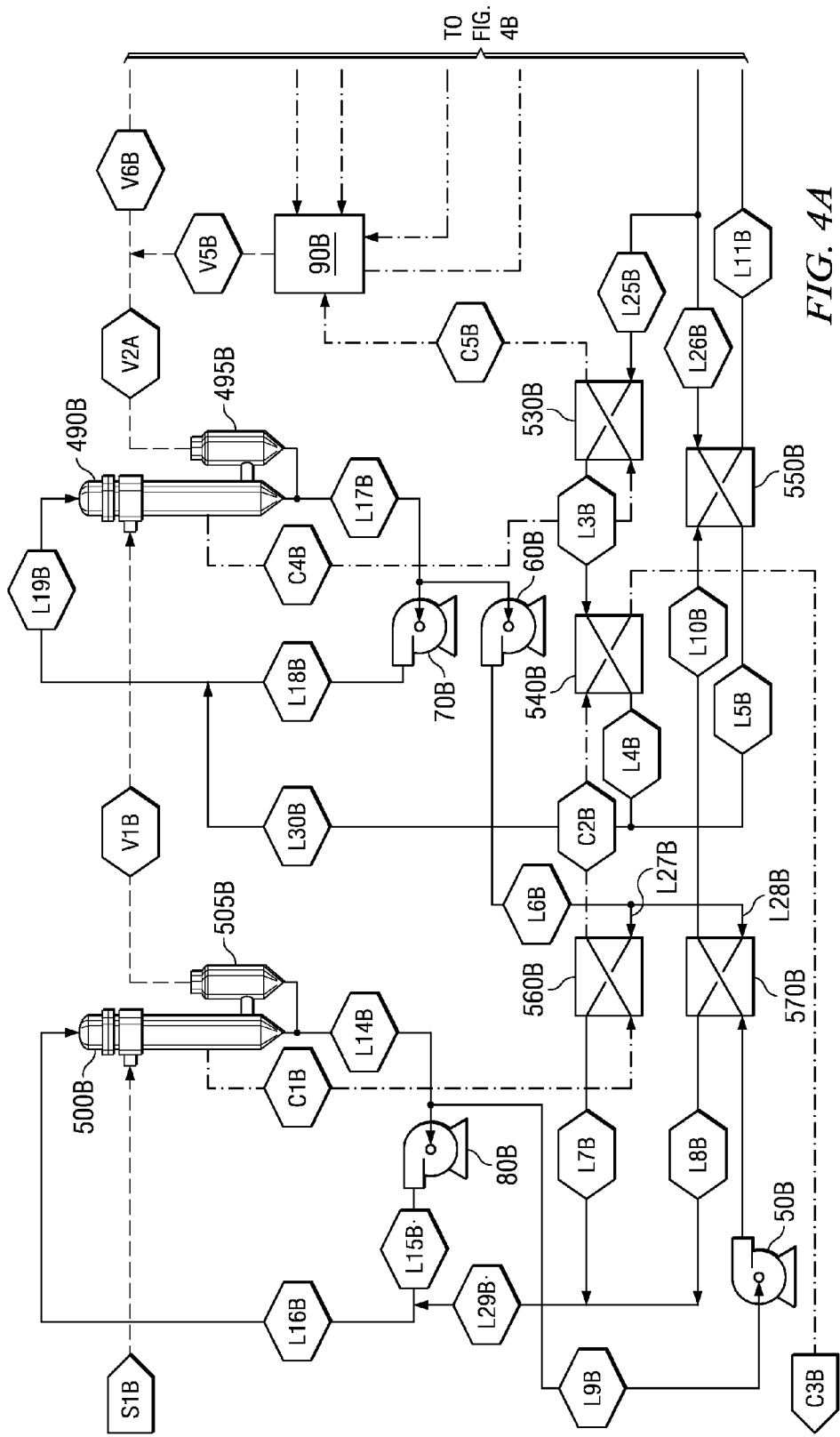
FIG. 4A is a flow sheet for another embodiment of this invention.
Figure 4B:
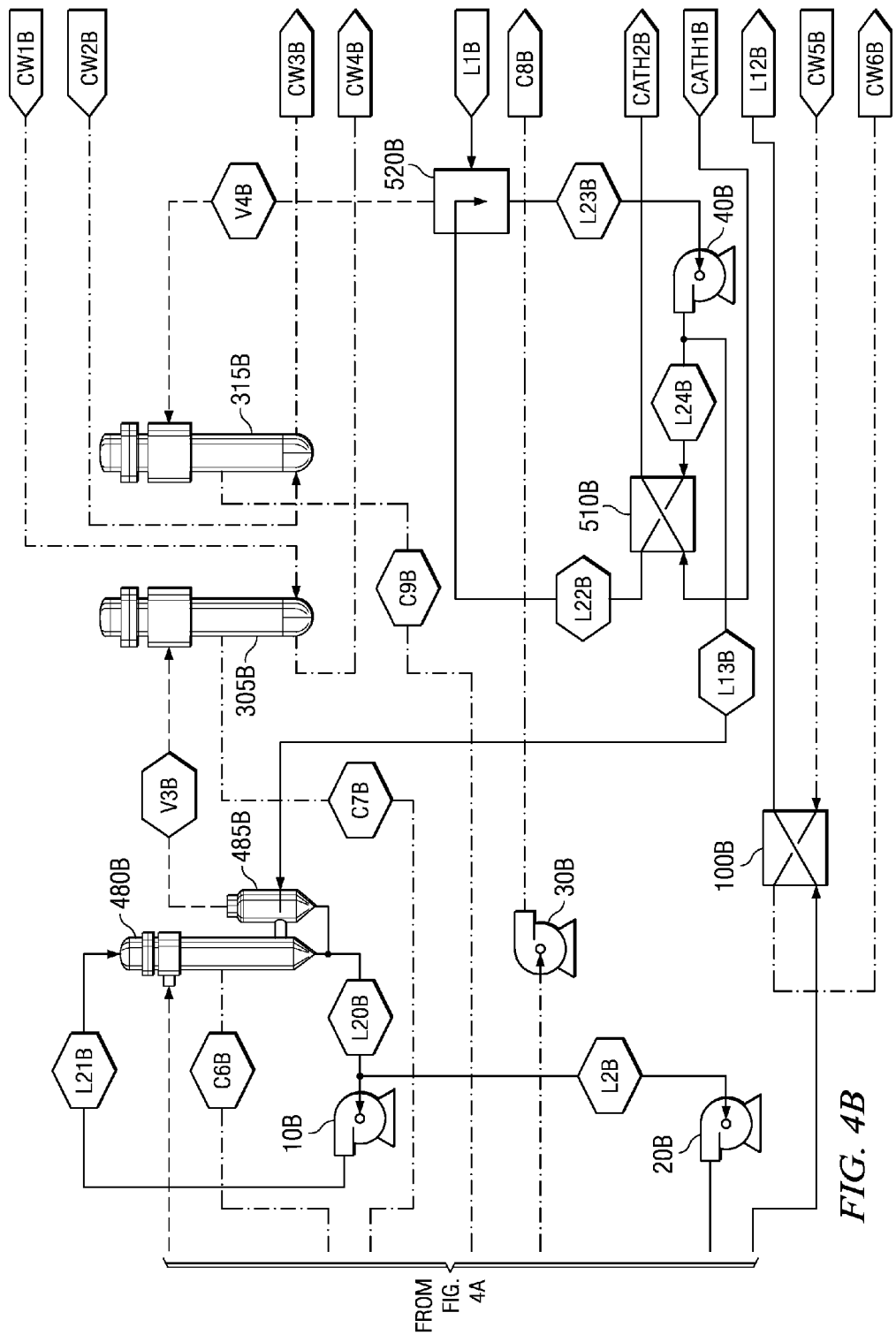
FIG. 4B is a flow sheet for another embodiment of this invention.

FIGS. 4A and 4B are a flow diagram for another embodiment of the invention. FIGS. 5A-5D are a table showing mass balance and temperatures of an example of this embodiment for the production of 1,000 ECU a day. This embodiment would be the preferred embodiment when the electrolytic cells as discussed in FIG. 1 are not located in close proximity to the concentration process equipment. In this embodiment, approximately 5 times the catholyte concentration flow is being circulated back to the electrolytic cell.

Referring to FIGS. 4A and 4B, the catholyte removed from cathode chamber 20 in FIG. 1 which is to be concentrated flows through line L1B at an approximate rate of 291,700 lbs/hr, an approximate temperature of 190° F., and an approximate concentration of 32% caustic soda by weight. Line L1B is attached to flash chamber 520B. Catholyte flows through line L1B into flash chamber 520B and water vapor escapes from the catholyte due to the decrease in pressure causing the temperature of remaining aqueous caustic soda to be decreased and leaving a higher concentration of aqueous caustic soda.

The concentrated aqueous caustic soda exits flash chamber 520B through line L23B and is pumped by pump 40B through line L23B. The aqueous caustic soda leaving flash chamber 520B has an approximate flow rate of 1,369,600 lbs/hr, an approximate concentration of 37.1% caustic soda, and an approximate temperature of 148° F. Line L23B splits into two lines, line L24B and line L13B.

Line L24B is connected to catholyte heat exchanger 510B. The aqueous caustic soda flows through catholyte heat exchanger 510B at a flow rate of approximately 1,369,000 lbs/hr and is heated to approximately 180° F. It exits catholyte heat exchanger 510B through line L22B. Line L22B is connected to flash chamber 520B and allows the heated aqueous caustic soda to flow into flash chamber 510B. Line L22B and line L23B form a circulation loop for flash chamber 520B.

The heat source for catholyte heat exchanger 510B is the circulation line from cathode chamber 20 in FIG. 1. Line CATH1B is attached to catholyte heat exchanger 510B and the catholyte from the electrolytic cells flows through line CATH1B into catholyte heat exchanger 510B. The catholyte s cooled and exits through line CATH2B. Line CATH2B brings the cooled catholyte back to the electrolytic cell. The catholyte flows through lines CATH1B and CATH2B at an approximate rate of 2,200 gal/mm. The catholyte in line CATH1B has an approximate temperature of 190° F. and is cooled to approximately 160° when it reaches line CATH2B. The flow rate of catholyte in CATH2B is approximately 5 times the flow rate of catholyte in line L1B.

The water vapor released in flash chamber 520B exits flash chamber 520B through vapor line V4B. Vapor line V4B is connected to second surface condenser 315B and the vapor flowing through vapor line V4B is condensed back to water in second surface condenser 315B. A barometric condenser could also be used for this service. The water vapor in vapor line V4B has an approximate flow rate of 40,000 lbs/hr at an approximate temperature of 147° F. and an approximate pressure of 1.17 psia.

Flash chamber 520B and catholyte heat exchanger 510B can be constructed of stainless steel due to the concentration of caustic soda in contact with these pieces of equipment.

Line L13B is connected to third effect vapor body 485A and the aqueous caustic soda which is to be further concentrated flows through line L13B into third effect vapor body 485B at an approximate flow rate of 251,600 lbs/hr and an approximate temperature of 148° F. The approximate concentration of caustic soda in the aqueous caustic soda in line L13B is 37.1%.

Third effect vapor body 485B is connected to third effect heating element 480B. The concentrated aqueous caustic soda that flows through line L13B is heated in third effect heating element 480B causing water vapor to be released and leaving a further concentrated aqueous caustic soda.

The vapor released from third effect vapor body 485B exits through vapor line V3B, at an approximate rate of 18,400 lbs/hr, an approximate pressure of 1.17 psia and an approximate temperature of 157° F. Vapor line V3B is connected to surface condenser 305B and the vapor flowing through vapor line V3B is condensed back to water in surface condenser 305B. A barometric condenser could also be used for this service.

The concentrated aqueous caustic soda exits third effect vapor body 485B and exits from third effect heating element 480B through line L20B at an approximate flow rate of 2,402,600 lbs/hr, an approximate temperature of 157° F., and an approximate concentration of 40% caustic soda by weight.

Line L20B splits into lines L2B and L21B. Line L21B is a circulation loop for third effect heating element 480B. The aqueous caustic soda in line L21B is pumped to the third effect heating element by pump 10B at an approximate flow rate of 2,169,300 lbs/hr.

The heating source for third effect heating element 480B is the vapor released from second effect heating element 495B flowing through vapor line V2B and any vapor released from process condensate receiver 90B flowing through vapor line V5B. Vapor lines V5B and V2B join to form vapor line V6B which is connected to third effect heating element 480B. The vapor flow through vapor line V2B is approximately 22,000 lbs/hr at an approximate temperature of 226° F. and an approximate pressure of 5.7 psia. The vapor from process condensate receiver 90B through vapor line V5B is mainly a line to bleed any vapors released into process condensate receiver 90B from the collection of the different condensate lines. The addition of any vapor through vapor line V5B is minimal and thus, the composition of vapor flowing through vapor line V6B is substantially the same as the vapor flowing through vapor line V2B.

The condensed vapor that exits third effect heating element 480B flows through condensate line C6B. Condensate line C6B connects to process condensate receiver 90B. The condensed vapor in condensate line C6B has a temperature of approximately 167° F. and a flow rate of approximately 22,000 lbs/hr.

Line L2B splits into lines L25B and L26B. The caustic flowing through line L2B is pumped into line L25B and line L26B by pump 20B. The concentrated aqueous caustic soda flowing in line L2B has an approximate temperature of 157° F., an approximate flow rate of 233,300 lbs/hr, and an approximate concentration of 40% caustic soda by weight. The aqueous caustic soda in line L2B is split approximately 50,000 lbs/hr into line L25B and approximately 183,300 lbs/hr into line L26B.

Line L25B connects to second effect condensate preheater 530B. Aqueous caustic soda flowing through line L25B is heated as it flows through second effect condensate preheater 530B and exits through line L3B. The temperature of the aqueous caustic soda leaving second effect condensate preheater 530B is approximately 197° F. and has a flow rate of approximately 50,000 lbs/hr.

Second effect condensate preheater 530B uses the condensed vapor from second effect heating element 490B as the heat source. The condensed vapor flows from second effect heating element 490B through condensate line C4B into second effect condensate preheater 530B. The condensed vapor is cooled further as it proceeds through second effect condensate preheater 530B and exits through condensate line C5B into process condensate receiver 90B. The condensed vapor enters second effect condensate preheater 530B with a temperature of approximately 237° F. and exits at a temperate of approximately 158° F. The approximate flow rate of the condensed vapor through second effect condensate preheater 530B is 24,700 lbs/hr.

Line L3B is also connected to second steam condensate preheater 540B. The heated aqueous caustic soda from second effect condensate preheater 530B flows through line L3B into second steam condensate preheater 540B, is heated further and exits through line L4B. The exit temperature of the aqueous caustic soda from the second steam condensate preheater 540B is approximately 231° F.

The heat source for second steam condensate preheater 540B is the condensed steam from first effect heating element 500B after being further cooled by first steam condensate preheater 560B. The condensed steam enters second steam condensate preheater 540B through condensate line C2B and exits through condensate line C3B. Condensate line C3B transports the condensed steam back to and the boiler feed system to be reused as steam. The condensed steam entering second steam condensate preheater 540B has a temperature of approximately 250° F. and an exit temperature of approximately 210° F. The flow rate of the steam is approximately 36,500 lbs/hr.

Line 26B is connected to second product preheater 550B. The aqueous caustic soda flowing through line L26B is heated in the second product preheater 550B before exiting through line L5B at an approximate temperature of 240° F. and an approximate flow rate of 183,300 lbs/hr. The heat source for second product preheater 550B is the final product aqueous caustic soda from first effect heating element 500B and first effect vapor body 505B after being cooled by first product preheater 570B. The final product aqueous caustic soda enters second product preheater 550B through line L10B at a temperature of approximately 260° F., is cooled and exits through line L11B at a temperature of approximately 158° F.

Line L5B and line L4B join and form line L30B. Line L30B joins with line L19B, which is connected to second effect heating element 490B. The aqueous caustic soda which is to be further concentrated enters second effect heating element 490B through line L19B. The aqueous caustic soda flowing in line L30B has an approximate concentration of 40% caustic soda, an approximate temperature of 238° F., and an approximate flow rate of 233,300 lbs/hr. The aqueous caustic soda flowing through line L18B has an approximate concentration of 44.2% caustic soda, an approximate temperature of 226° F., and an approximate flow rate of 844,700. The resulting aqueous caustic soda from the joining of lines L18B and L30B into line L19B has an approximate temperature of 229° F., an approximate concentration of 43.3% caustic soda, and an approximate flow rate of 1,078,000 lbs/hr.

The aqueous caustic soda is heated in second effect heating element 490B. Second effect heating element 490B is connected to second effect vapor body 495B. The heating of the aqueous caustic soda releases water vapor and results in remaining aqueous caustic soda having a higher concentration of caustic soda.

The water vapor is removed from second effect vapor body 495B by vapor line V2B. Vapor line V2B joins with vapor line V5B from process condensate receiver 90B and forms vapor line V6B. The water vapor removed from second effect vapor body 495B flowing through vapor line V2B and from process condensate receiver 90B flowing through vapor line V5B combine in vapor line V6B and acts as the heat source for third effect heating element 480B.

The concentrated aqueous caustic soda exits second effect heating element 490B and second effect vapor body through line L17B at an approximate flow rate of 1,056,000 lbs/hr, an approximate temperature of 226° F., and an approximate concentration of 44.2% caustic soda by weight.

Line L17B splits into lines L18B and L6B. Line L18B joins with line L30B to create line L19B. Line L18B is part of a circulation line for second effect heating element 490B. The aqueous caustic soda in line L18B is pumped by pump 70B. The aqueous caustic soda in line L6B has a temperature of approximately 226° F., flow rate of approximately 211,300 lbs/hr, concentration of approximately 44.2% caustic soda and proceeds to be further concentrated.

Line L6B splits into line L27B and line L28B. The aqueous caustic soda contained in line L6B is pumped by pump 60B.

Line L27B is connected to first steam condensate preheater 560B. The aqueous caustic soda which flows through line L27B at an approximate flow rate of 90,000 lbs/hr enters first steam condensate preheater 560B, is heated, and exits through line L7B with a temperature of approximately 296° F.

The heat source for first steam condensate preheater 560B is the condensed steam from first effect heating element 500B which flows through condensate line C1B at an approximate rate of 36,500 lbs/hr and an approximate temperature of 362° F. The condensed steam flows through first steam condensate preheater 560B, is cooled and exits through condensate line C2B, which is connected to second steam condensate preheater 540B.

Line L28B is connected to first product preheater 570B. The aqueous caustic soda which flows through line L28B enters first product preheater 570B and exits through line L8B at a flow rate of approximately 121,300 lbs/hr. The aqueous caustic soda is heated as it flows through first product preheater 570B from approximately 226° F. to approximately 298° F.

The heat source for first product preheater 570B is the final product aqueous caustic soda from the first effect heating element 500B and first effect vapor body 505B. The final product aqueous caustic soda enters first product preheater 570B through line L9B at an approximate flow rate of 186,700 lbs/hr, an approximate temperature of 320° F., and an approximate 50% concentration of caustic soda and exits through line L10B at an approximate temperature of 260° F. As the final product aqueous caustic soda flows through first product preheater 570B, where it is cooled.

Line L7B and line L8B join and form line L29B. The aqueous caustic soda in line L29B has an approximate temperature of 297° F. and an approximate flow rate of 211,300 lbs/hr. Line L29B joins with line L15B to form line L16B. The aqueous caustic soda flowing in line L15B has an approximate concentration of 50% caustic soda, an approximate temperature of 320° F., and an approximate flow rate of 131,100 lbs/hr, therefore, when joined with the aqueous caustic soda in line L29B, the resulting aqueous caustic soda in line L16B has an approximate temperature of 306° F., an approximate flow rate of 342,400 lbs/hr, and an approximate concentration of 46.4% caustic soda by weight. Line L16B is connected to first effect heating element 500B. The aqueous caustic soda flowing through line L16B flows into first effect heating element 500B and is heated in order to release water vapor and concentrate the aqueous caustic soda further.

The heating source for first effect heating element 500B is steam which enters first effect heating element through steam line S1B at a temperature of approximately 380° F., a pressure of approximately 194.7 psia and a flow rate of approximately 36,500 lbs/hr. The steam after being condensed as it proceeds through first effect heating element 500B, exits through condensate line C1B. As discussed previously, the condensed steam from first effect heating element 500B is further cooled as it flows through first steam condensate preheater 570B and second steam condensate preheater 540B before if flows back to the boiler to make additional steam.

First effect heating element 500B is connected to first effect vapor body 505B and it is from first effect vapor body 505B that the vapor is released. The vapor leaves first effect vapor body 505B through vapor line V1B at an approximate rate of 24,700 lbs/hr, an approximate pressure of 24.1 psia and an approximate temperature of 320° F. This vapor is the heat source for second effect heating element 490B.

The final product aqueous caustic soda exits first effect heating element 500B and first effect vapor body 505B through line L14B. The final product aqueous soda in line L14B has an approximate concentration of 50% caustic soda, an approximate flow rate of 317,800 lbs/hr, and an approximate temperature of 320° F.

Line L14B splits into lines L15B and L9B. Line L15B connects with line L29B. L15B is used to circulate a portion of the final product aqueous caustic soda back to first effect heating element 500B. The final product aqueous caustic soda which flows through line L15B is pumped through pump 80B.

The final product aqueous caustic soda is pumped by pump 50B through line L9B into first product preheater 570B, through line L10B, into second product preheater 550, and through line L11B. Through both first product preheater 570B and second product preheater 550B, final product aqueous caustic soda is cooled.

Line L11B is connected to product cooler 100B. Final product caustic soda is cooled as it flows through product cooler 100B from approximately 158° F. to approximately 120° F. It exits product cooler 100B through line L12B. Line L12B takes final product aqueous caustic soda to be stored, sold, or used in another process.

The cooling source for product cooler 100B is cooling water that flows in through cooling water line CW5B and out through cooling water line CW6B. The cooling water flows through product cooler 100B at a flow rate of approximately 1,000 gal/min and is heated from approximately 85° F. to approximately 96° F.

Cooling water is used to condense vapors from flash chamber 520B and from third effect vapor body 485B. Cooling water line CW2B is connected to second surface condenser which condenses the vapors released from flash chamber 520B. Cooling water flows through second surface condenser 315B at an approximate flow rate of 8,000 gal/min and exits through cooling water line CW3B at an approximate temperature of 96° F. The condensed vapor flows from second surface condenser 315B through condensate line C9B.

Condensate line C9B connects to process condensate receiver 90B and the condensate vapor flows into process condensate receiver 90B at an approximate temperature of 105° F. and an approximate flow rate of 40,000 lb/hr.

Cooling water line CW1B is connected to surface condenser 305B to allow cooling water to enter surface condenser 305B and cool vapors released from third effect vapor body 485B. The condensed vapor leaves the surface condenser 305B through condensate line C7B, which is also connected to process condensate receiver 90B, at an approximate temperature of 105° F. and an approximate flow rate of 18,400 lb/hr. The cooling water flows through the surface condenser 305B at an approximate rate of 8,000 gal/min and is heated from approximately 85° F. to approximately 90° F.

The cooling water leaves surface condenser 305B through cooling water line CW4B.

Cooling Water lines CW3B, CW4B, and CW6B carry the cooling water back for cooling such that it can be reused through cooling water lines CW1B, CW2B, and CW5B or in other parts of the facility.

Process condensate receiver 90B receives condensate from third effect heating element 480B though condensate line C6B, surface condenser 305 through condensate line C7B, second surface condenser 315B through condensate line C9B, and second effect condensate preheater 530B through condensate line C5B. Vapors released in process condensate receiver 90B, if any, are removed through vapor line V5B, which joins vapor line V2B as the heat source for third effect heating element 480B. The liquid condensate, or water, is pumped from process condensate receiver 90B by pump 30B through condensate line C8B at an approximate temperature of 131° F. and an approximate flow rate of 105,000 lb/hr. The water can be used within the plant or used as water source for the electrolytic cell.

The construction material of first effect heating element 500B, first effect vapor body 505B, first steam condensate preheater 560B, first product preheater 570B, second effect heating element 490B, second effect vapor body 495B, second steam condensate preheater 540B, second product preheater 550B and second effect condensate preheater 530B should be of a material that is resistant to corrosion by caustic soda, such as nickel. The construction material for the third effect heating element 480B and third effect vapor body 485B can be a higher grade of stainless steel.

Flash chamber 520A and 520B can either be a flash chamber or an evaporator vapor body, both of which are known in the art.

Product cooler 100A and 100B, second effect condensate preheater 530A and 530B, second product preheater 550A and 550B, second steam condensate preheater 540A and 540B, first product preheater 570A and 570B, first steam condensate preheater 560A and 560B, and catholyte heat exchanger 510A and 510B are heat exchangers known in the art for allowing heat to transfer between two liquids or a vapor and a liquid, depending on the composition of the materials flowing through the exchangers. Surface condenser 305A and 305B and second surface condenser 315A and 315B are condensers known in the art for condensing vapors to liquids by using of cooling water.

Process condensate receiver 90A and 90B is a tank or chamber known in the art for collecting condensate from several locations and bleeding off any vapors that are released into the receiver due to the combining of multiple condensate lines.

First effect heating element 500A and 500B, first effect vapor body 505A and 505B, second effect heating element 490A and 490B, second effect vapor body 495B and 495A, third effect heating element 480A and 480B anti third effect vapor body 485A and 485B are evaporation systems known in the art.

The above example gives an embodiment which attempts to optimize the use and recovery of heat from different heat sources as part of the concentration process of aqueous caustic soda. However, those skilled in the art will recognize that this invention can be practiced without the use of second effect condensate preheater 530B, second stream condensate preheater 540B, second product preheater 550B, first steam condensate preheater 560B, first product preheater 570B, and product cooler 100B, or one of more of these devices can be incorporated.

Those skilled in the art will recognize that catholyte heat exchanger 510B can consist of two or more heat exchangers arranged in either series or parallel, and flash chamber 520B can consist of two or more flash chambers connected to two or more vapor bodies arranged in either series or parallel.

Further, those skilled in the art will recognize that the concentrations of caustic soda flowing through this one embodiment can vary in actual practice. For example, the concentration of the aqueous caustic soda flowing through line L1B can range from approximately 31.0% to approximately 33.0% caustic soda by weight. The concentration of the aqueous caustic soda flowing from flash chamber 520B and through line L13B can range from approximately 36.0% to approximately 38.2% caustic soda by weight. The concentration of the aqueous caustic soda flowing from third effect heating element 480B and third effect vapor body 485B and through line L2B can range from approximately 38.8% to approximately 41.2% caustic soda by weight. The concentration of the aqueous caustic soda flowing from second effect heating element 490B and second effect vapor body 495B and through line L6B can range from approximately 42.9% to approximately 45.5% caustic soda by weight. The concentration of the final product aqueous caustic soda flowing from first effect heating element 500B and first effect vapor body 505B and through line L9B can range from approximately 48.5% to approximately 51.5% caustic soda by weight.

Although caustic soda is most commonly sold as a 50% concentration product, either embodiment of the invention may be employed as an initial step toward achieving caustic soda concentrations greater than 50%, including the 70% and 100% commercial grades of caustic soda.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method of concentrating an aqueous alkali comprising:
   providing an electrolytic cell with a cation membrane;
   providing a catholyte comprising aqueous alkali with an initial alkali concentration from the electrolytic cell;
   splitting the catholyte into a first stream and a second stream wherein the first stream and the second stream have the initial alkali concentration at a first temperature;
   providing an evaporation system including an effect evaporator and a flash evaporator;
   providing a catholyte heat recovery system;
   recovering heat from the first stream in the catholyte heat recovery system;
   flowing the second stream into the evaporation system;
   heating the second stream with the catholyte heat recovery system;
   evaporating water from the second stream to create a third stream at a second temperature and a final alkali concentration wherein the final alkali concentration is greater than the initial alkali concentration;
   recovering heat from the third stream to create a final product at a final temperature by circulating the third stream through the catholyte heat recovery system; and
   adjusting the evaporation system to have the second temperature greater than the first temperature.

2. The method of concentrating an aqueous alkali of claim 1 wherein:
   the step of evaporating water from the second stream includes concentrating the aqueous alkali in at least one effect evaporator prior to recovering heat from the first stream.

3. The method of concentrating an aqueous alkali of claim 1 wherein:
   the step of evaporating water from the second stream includes concentrating the aqueous alkali in the flash evaporator;
   the step of recovering beat from the third stream is performed after concentrating the aqueous alkali in the flash evaporator; and,
   further concentrating the aqueous alkali in the set of effect evaporators.

4. The method of concentrating an aqueous alkali of claim 1 wherein the step of providing an evaporation system includes providing a triple effect evaporator as the effect evaporator.

5. The method of concentrating an aqueous alkali of claim 1 wherein the step of providing an evaporation system includes providing a double effect evaporator as the effect evaporator.

6. The method of concentrating an aqueous alkali of claim 1 wherein the step of providing an evaporation system includes providing a single effect evaporator as the effect evaporator.

7. The method of concentrating an aqueous alkali of claim 1, further comprising:
   adjusting the evaporation system to have the first temperature at about 190° F. and the second temperature at about 320° F.

8. The method of concentrating an aqueous alkali of claim 1, further comprising
   adjusting the flow rates of the first stream, second stream and third stream to create the final product at a flow rate of about 190,000 lb/hr.

9. The method of concentrating an aqueous alkali of claim 1 further comprising:
   providing one or more heat exchangers, one or more flash evaporators and one or more evaporator bodies in the catholyte heat recovery system.

10. The method of concentrating an aqueous alkali of claim 1 further comprising:
    concentrating the aqueous alkali to between about 70% and 100% alkali by weight.

11. The method of concentrating an aqueous alkali of claim 1 further comprising:
    concentrating the aqueous alkali to about 50% alkali by weight.

* * * * *